United States Patent [19]
Kreyenborg et al.

[11] Patent Number: 4,725,215
[45] Date of Patent: Feb. 16, 1988

[54] EXTRUDER WITH EXCHANGEABLE FILTER FOR FOAMED PLASTIC MATERIAL

[75] Inventors: Udo Kreyenborg, Münster-Kinderhaus; Horst Köching, Münster-Sprakel, both of Fed. Rep. of Germany

[73] Assignee: Kreyenborg Verwaltungen und Beteiligungen KG, Münster-Kinderhaus, Fed. Rep. of Germany

[21] Appl. No.: 946,493

[22] Filed: Dec. 24, 1986

[30] Foreign Application Priority Data

Feb. 26, 1986 [DE] Fed. Rep. of Germany ....... 3606138

[51] Int. Cl.[4] ............................................. B29C 47/68
[52] U.S. Cl. ..................................... 425/185; 210/234; 210/236; 425/198
[58] Field of Search ................... 425/185, 188, 192 R, 425/208, 197–199, 186; 210/234, 236

[56] References Cited

U.S. PATENT DOCUMENTS

| 3,455,357 | 7/1969 | Zink | 425/197 X |
| 3,804,758 | 4/1974 | Cooper et al. | 210/236 X |
| 3,900,399 | 8/1975 | Kreyenborg et al. | 210/236 |
| 4,025,434 | 5/1977 | Mladota | 210/236 |
| 4,202,659 | 5/1980 | Kinoshita et al. | 425/185 X |
| 4,507,072 | 3/1985 | Gaul, Jr. | 210/236 X |
| 4,588,502 | 5/1986 | Zibell et al. | 425/199 X |

FOREIGN PATENT DOCUMENTS

| 2153962 | 8/1972 | Fed. Rep. of Germany . |
| 2130501 | 10/1972 | Fed. Rep. of Germany . |
| 2942849 | 3/1983 | Fed. Rep. of Germany ...... 425/197 |

Primary Examiner—Richard L. Chiesa
Attorney, Agent, or Firm—Peter K. Kontler

[57] ABSTRACT

An extruder wherein the housing which defines a passage for the flow of foamed plastic material at elevated pressure and temperature to the shaping station contains a reciprocable carrier of one or more filters. The carrier has a filter compartment and is movable relative to the housing between a first position wherein the plastic material must flow from the inlet of the passage, through the compartment and the filter therein, and on to the outlet of the passage, and a second position in which the compartment is sealed from the passage. An expansion chamber in the housing and/or in the carrier communicates or can be caused to communicate with the compartment in the second position of the carrier so as to allow for a controlled reduction of pressure of plastic material before the compartment is made accessible for removal of inspection of the filter in the compartment. The compartment is thereupon rendered accessible, either in the second position of the carrier or by moving the carrier to a further position.

12 Claims, 4 Drawing Figures

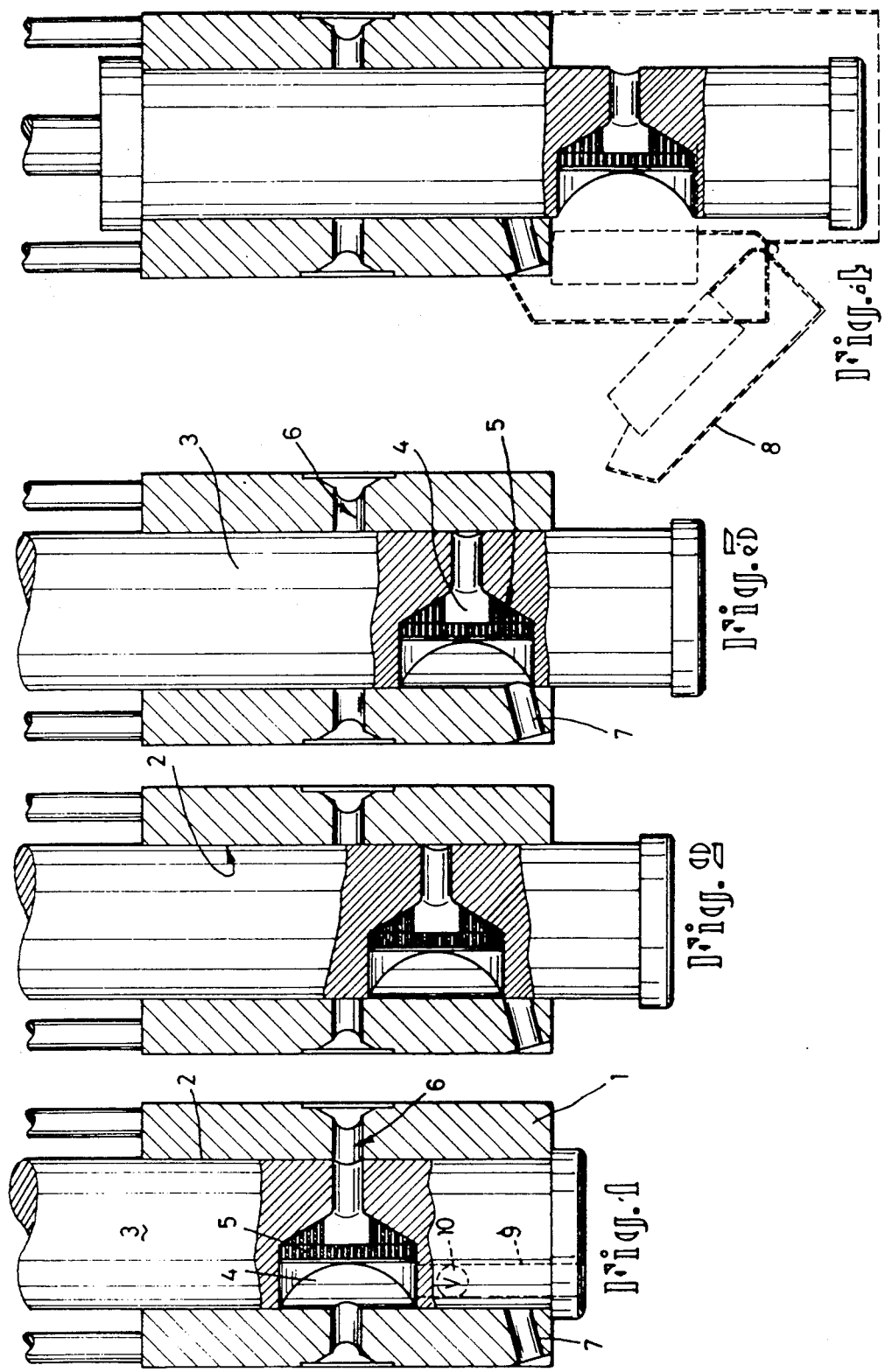

EXTRUDER WITH EXCHANGEABLE FILTER FOR FOAMED PLASTIC MATERIAL

CROSS-REFERENCE TO RELATED CASE

The present application is owned by the assignee of the copending U.S. patent application Ser. No. 864,081 filed May 16, 1986 and now U.S. Pat. No. 4,701,118 by Horst Köching et al. for "Apparatus for filtering plasticized materials in extruders".

BACKGROUND OF THE INVENTION

The invention relates to apparatus for processing plastic materials, and more particularly to improvements in extruders and like apparatus wherein a continuous stream of plastic material is caused to advance to one or more dies or mold cavities to be converted into a succession of discrete products or into one or more continuous products in the form of strands, sheets, rods, bars or the like.

German Pat. No. 29 42 849 to Kreyenborg discloses an apparatus wherein the flow of plastic material to a die or the like can be interrupted by a reciprocable holder for a series of filters in discrete compartments. The filters can be moved into register with the passage so that the plastic material must penetrate through a selected filter in order to be relieved of foreign matter on its way toward the shaping station. The arrangement is such that some plastic material can penetrate into a next-following filter compartment while the preceding filter compartment establishes communication between the inlet and outlet ends of the passage for plasticized material. The next-following filter compartment is then connected with the atmosphere by a suitable valve so that it can be filled with plasticized material before it reaches the operative position of alignment with the passage. The patented apparatus operates satisfactorily for the processing of unfoamed plastic materials.

German Auslegeschrift No. 2 153 962 of Buchheit et al. discloses an apparatus wherein the leader of a stream of plasticized material is permitted to escape by way of a bypass channel before the passage for the flow of plasticized material to the shaping station is traversed by a filter. This ensures that the improperly heated and/or air-containing and/or otherwise unacceptable portion of the stream of plasticized material is not converted into an unsatisfactory product. Moreover, it is possible to gain access to a filter while the plasticized material is caused to penetrate through a spare filter or into the aforementioned bypass channel.

German Offenlegungsschrift No. 2 130 501 of block-shaped filter holders can be advanced into register with the path for the flow of plasticized material toward the shaping station. The holder which is maintained in a position of readiness can be filled with plasticized material in response to opening of a valve so that the plasticized material expels air before the holder advances to a position in which the plasticized material flowing toward the shaping station must penetrate through its filter or filters.

A drawback of the aforediscussed apparatus is that removal of a clogged filter can present problems, particularly injuries to attendants and/or contamination of the surrounding area, if the material to be converted into shaped plastic articles is a foamed thermoplastic substance which is maintained at an elevated pressure during flow toward the shaping station. Foaming is achieved by mixing the plasticized material with a suitable blowing or foaming agent which causes the plasticized material to expand upstream and/or downstream of the filter. The filter compartment which is in register with the passage for the flow of plasticized material to the shaping station (e.g., to a die with apertures for strands of foamed plastic material) is filled with plasticized material which is maintained at an elevated pressure. Thus, the contents of the filter compartment expand abruptly as soon as the compartment is permitted to communicate with the surrounding atmosphere. The material which is thereby expelled from the filter compartment can contaminate the area in and around the apparatus and can cause serious injury or injuries to the attendant or attendants, especially since the material leaving the filter compartment is normally maintained at an elevated temperature.

OBJECTS AND SUMMARY OF THE INVENTION

An object of the invention is to provide an extruder or a similar apparatus for processing foamed plastic material which is constructed and assembled in such a way that the heated and pressurized material which is confined in the filter compartment cannot cause damage and/or injury after the filter compartment leaves the position of alignment with the passage for the flow of foamed plastic material to one or more shaping stations.

Another object of the invention is to provide a novel and improved carrier for one or more filters and a novel and improved housing for the carrier.

A further object of the invention is to provide a novel and improved method of relieving the pressure of foamed plastic material in the filter compartment which is about to be relieved of its filter or filters.

An additional object of the invention is to provide a novel and improved method of effecting controlled expansion of the mixture of foaming agent and plasticized material in a filter compartment which must be rendered accessible for the purpose of inspecting or removing the filter or filters therein.

Still another object of the invention is to provide a novel and improved combination of filter carrier and housing for the filter carrier which can be used in existing extruders and like plastic processing apparatus as a superior substitute for heretofore known combinations.

Another object of the invention is to provide an extruder wherein the pressure in the filter compartment is automatically relieved in response to movement of the filter compartment to a position in which its filter or filters are accessible.

The invention is embodied in a combination of parts which can be used in an extruder or in a similar apparatus for making articles from foamed plastic material. The combination comprises a housing member which defines a passage for the flow of foamed or foamable plastic material at an elevated pressure. The passage has an inlet and an outlet which latter is spaced apart from the inlet, and the improved combination further comprises a carrier member which is movably installed in the housing member and has a compartment and filter means (e.g., a stack of sieves) in the compartment. The housing member and/or the carrier member has at least one expansion chamber, and one of the members (e.g., the carrier member) is movable relative to the other member (and/or vice versa) between a first position in which the compartment connects the inlet with the outlet so that the plastic material must flow through the filter means on its way from the inlet to the outlet, and a second position in which the compartment is sealed from the outlet and/or inlet of the passage and the compartment is connected or connectable with the expansion chamber to relieve the pressure in the compartment.

The expansion chamber can be provided in the carrier member and the latter then further comprises means (e.g., a valve) for normally sealing the compartment from the expansion chamber but for permitting the flow of plastic material from the compartment into the expansion chamber (a) in automatic response to movement of the compartment to a position in which the compartment is sealed from the passage or (b) at the will of the operator.

In accordance with another embodiment of the invention, the expansion chamber is provided in the housing member and communicates with the compartment in response to movement of the movable member to its second position. Such movable member is movable, or can be moved, to a third position between the first and second positions in which the compartment is sealed from the passage as well as from the expansion chamber. The arrangement may be such that the filter means is accessible or can be made accessible in the second position or in a further position of the movable member.

A portion of the expansion chamber can be defined by the interior of a vessel which can form part of the housing member. The vessel can be movably mounted on the main portion of the housing member, and the latter can be formed with a channel which forms part of the expansion chamber and establishes communication between the filter compartment and the interior of the vessel in the second position of the movable member.

A fluid-operated motor or other suitable means can be provided to move the movable member relative to the other member or vice versa. The housing member can be provided with a bore which extends transversely of and intersects the passage between the inlet and the outlet, and the carrier member is then sealingly received and is reciprocable in the bore. The compartment of the carrier member can be provided with a relatively large material admitting portion which communicates with the inlet and with a relatively small material discharging portion which communicates with the outlet of the passage in the first position of the movable member. The material admitting portion of the compartment communicates or can be caused to communicate with the expansion chamber in the second position of the movable member.

The novel features which are considered as characteristic of the invention are set forth in particular in the appended claims. The improved combination of parts itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly sectional view of an extruder which embodies the invention;

FIG. 2 shows the structure of FIG. 1 but with the carrier member in a different position;

FIG. 3 shows the structure of FIG. 1 but with the carrier member in a third position; and FIG. 4 shows a portion of a modified extruder wherein a portion of the expansion chamber is defined by a vessel which is pivotably mounted on the housing member, the carrier member being shown in a fourth position.

DESCRIPTION OF THE PREFERRED EMBODIMENTS

FIGS. 1 to 3 show a portion of an extruder wherein a housing member 1 (hereinafter called housing for short) has a cylindrical bore 2 for a reciprocable plunger-like carrier member 3 (hereinafter carrier) for one or more filters 5. The housing 1 is further formed with a diametrically extending passage 6 having an inlet at one side and an outlet at the opposite side of the reciprocable carrier 3. The source of foamed plastic material which is admitted into the inlet of the passage 6 is not shown; the outlet of this passage conveys material to a station where the material is converted into one or more continuous products or into series of discrete products in a manner not forming part of the invention. By way of example, the outlet of the passage 6 can admit material into one or more mold cavities or into one or more holes of a die which causes the plastic material to form one or more strands, plates, sheets, bars, rods or the like.

The carrier 3 defines a filter compartment 4 which removably receives the filter 5; the latter can constitute a package of discrete filters or sieves serving to intercept any foreign matter which flows from the inlet to the outlet of the passage 6 when the carrier 1 is held in a first position (FIG. 1) in which the compartment 4 establishes a path for the flow of foamed plastic material from the inlet to the outlet. The material which flows from the inlet toward the outlet of the passage 6 can contain a mixture of thermoplastic material and a suitable blowing or foaming agent. The two constituents of the mixture are brought into contact with one another ahead of the inlet of the passage 6, and the foaming agent causes or can cause the pressure of the mixture which fills the compartment 4 to rise well above atmospheric pressure.

In accordance with a feature of the invention, the housing 1 is formed with a channel 7 which constitutes or forms part of an expansion chamber and allows the pressure in the compartment 4 to drop in response to movement of the carrier 3 to the (second) position of FIG. 3 in which the relatively large material admitting portion of the compartment 4 communicates with the channel 7. At such time, the outer end of the channel 7 is or can be sealed to prevent abrupt escape of pressurized material from the compartment 4. If desired, the distance between the channel 7 and the inlet of the passage 6 (as considered in the axial direction of the bore 2) can be selected in such a way that the carrier 3 can assume an intermediate (third) position which is shown in FIG. 2 and in which the compartment 4 is sealed from the passage 6 as well as from the expansion chamber (channel 7). The carrier 3 automatically reaches the position of FIG. 2 on its way from the position of FIG. 1 to the position of FIG. 3 or vice versa. The carrier 3 is thereupon moved to a further position (FIG. 4) in which the compartment 4 is accessible to allow for removal of the filter 5 and for insertion of a fresh filter.

FIG. 4 shows that the expansion chamber can be defined in part by a vessel 8 (e.g., a pan-shaped receptacle) which can be said to form part of the housing 1 and is pivotably mounted on the main portion of the housing. The channel 7 establishes communication between the compartment 4 and the interior of the vessel 8 when the carrier 3 assumes a position corresponding to that shown in FIG. 3. The carrier 3 is thereupon moved to the position which is shown in FIG. 4 and in which the filter 5 in the compartment 4 is accessible in response to pivoting of the vessel 8 to its open or inoperative position. It is clear that the housing 1 comprises suitable means for sealing the interior of the vessel 8 and the channel 7 from the atmosphere when the vessel is held in the operative position. The vessel 8 can be used with advantage when the material in the compartment 4 is maintained at an elevated pressure so that its expansion into the channel 7 does not suffice to ensure that the compartment 4 can be exposed without endangering the attendants and/or contaminating the apparatus.

FIG. 1 shows that the apparatus can comprise several expansion chambers including that which comprises or is formed by the channel 7 and a chamber in the form of a channel 9 provided in the carrier 3 and normally sealed from the compartment 4 by a valve 10 or by other suitable sealing means. The valve 10 is opened automatically in response to movement of the carrier 3 to the position of FIG. 3 or by hand as soon as or after the carrier reaches the position of FIG. 3. The material which fills the compartment 4 is then free to expand into the channel 7 and into the channel 9.

The means (e.g., a fluid-operated motor) which is used to move the carrier 3 between its positions (e.g., four positions including those shown in FIGS. 1, 2, 3 and 4) is not shown in the drawing. The pressure in the compartment 4 rises under the action of the foaming agent and also because the cross-sectional area of the material discharging portion of the compartment 4 is smaller than that of the material admitting portion.

The carrier 1 can be provided with two or more compartments 4 for discrete filters 5 or groups of filters.

It has been found that the improved apparatus reliably eliminates the danger of injury to the attendants and/or contamination of the apparatus. This is due to controlled reduction of pressure of material which fills the compartment 4 before the filter 5 in the compartment is accessible (e.g., by way of the opening which is normally sealed by the vessel 8). The vessel 8 collects the material which issues from the compartment 4 by way of the channel 7 when the carrier 3 reaches the position of FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In an apparatus for processing foamed plastic material, a housing member defining a passage for the flow of foamed plastic material at elevated pressure, said passage having an inlet and an outlet spaced apart from said inlet; a carrier member movably installed in said housing member and having a compartment and filter means in said compartment, at least one of said members having at least one expansion chamber and at least one of said members being movable relative to the other of said members between a first position in which said compartment connects said inlet with said outlet so that plastic material must flow through said filter means on its way from said inlet to said outlet and a second position in which said compartment is sealed from said inlet and is connected or connectable with said expansion chamber so that the expansion chamber receives pressurized plastic material to thus relieve the pressure in said compartment.

2. The structure of claim 1, wherein said compartment is sealed from said inlet and from said outlet in the second position of said movable member.

3. The structure of claim 1, wherein said expansion chamber is provided in said carrier member and further comprising means for normally sealing said compartment from said expansion chamber.

4. The structure of claim 1, wherein said expansion chamber is provided in said housing member and communicates with said compartment in response to movement of said movable member to said second position.

5. The structure of claim 4, wherein said movable member is further movable to a third position between said first and second positions in which said compartment is sealed from said inlet and said outlet as well as from said expansion chamber.

6. The structure of claim 5, wherein said filter means is accessible in the second position of said movable member.

7. The structure of claim 1, further comprising a vessel defining a portion of said expansion chamber.

8. The structure of claim 1, wherein said vessel is movably mounted on said housing member and said housing member has a channel which forms part of said expansion chamber and establishes communication between said compartment and the interior of said vessel in the second position of said movable member.

9. The structure of claim 1, further comprising means for moving said movable member relative to the other of said members.

10. The structure of claim 1, wherein said housing member has a bore extending transversely of said passage and said carrier member is sealingly and reciprocably mounted in said bore.

11. The structure of claim 10, wherein said compartment has a relatively large material admitting portion which communicates with said inlet and a relatively small material discharging portion which communicates with said outlet in the first position of said movable member.

12. The structure of claim 11, wherein said material admitting portion is arranged to communicate with said expansion chamber in the second position of said movable member.

* * * * *